(12) United States Patent
Biddick et al.

(10) Patent No.: US 11,125,234 B2
(45) Date of Patent: Sep. 21, 2021

(54) REDUCING BEARING LOAD IN A REGENERATIVE TURBINE PUMP

(71) Applicant: Upwing Energy, LLC, Cerritos, CA (US)

(72) Inventors: David Biddick, Houston, TX (US); Justin Jongsik Oh, Irvine, CA (US); Patrick McMullen, Villa Park, CA (US)

(73) Assignee: Upwing Energy, LLC, Cerritos, CA (US)

(*) Notice: Subject to any disclaimer, the term of this patent is extended or adjusted under 35 U.S.C. 154(b) by 718 days.

(21) Appl. No.: 15/857,443

(22) Filed: Dec. 28, 2017

(65) Prior Publication Data
US 2019/0203719 A1 Jul. 4, 2019

(51) Int. Cl.
| F04D 5/00 | (2006.01) |
| F01D 25/16 | (2006.01) |
| F04D 29/24 | (2006.01) |
| F16C 32/04 | (2006.01) |
| F16C 17/04 | (2006.01) |
| F04D 29/08 | (2006.01) |
| F04D 29/041 | (2006.01) |
| F04D 29/40 | (2006.01) |

(52) U.S. Cl.
CPC ........... *F04D 5/002* (2013.01); *F01D 25/162* (2013.01); *F04D 5/006* (2013.01); *F04D 29/041* (2013.01); *F04D 29/086* (2013.01); *F04D 29/242* (2013.01); *F04D 29/406* (2013.01); *F16C 17/045* (2013.01); *F16C 32/0412* (2013.01); *F05B 2250/503* (2013.01); *F05D 2240/51* (2013.01)

(58) Field of Classification Search
CPC ........ F04D 5/002; F04D 5/003; F04D 13/026; F04D 13/00; F04D 13/0633; F04D 25/062
USPC ........................................................ 415/55.1
See application file for complete search history.

(56) References Cited

U.S. PATENT DOCUMENTS

| 5,899,673 | A | * | 5/1999 | Bosley | ...................... | F01D 5/04 415/55.1 |
| 6,468,051 | B2 | * | 10/2002 | Lampe | .................. | F04D 23/008 137/503 |
| 2015/0114632 | A1 | | 4/2015 | Romer et al. | | |

FOREIGN PATENT DOCUMENTS

GB    2501352    11/2017

* cited by examiner

*Primary Examiner* — Eldon T Brockman
(74) *Attorney, Agent, or Firm* — Fish & Richardson P.C.

(57) ABSTRACT

A regenerative turbine impeller includes a first side and a second side. An impeller housing surrounds the regenerative turbine impeller. The impeller housing includes a seal separating the first side and the second side of the regenerative turbine impeller. A first fluid inlet is fluidically coupled to the first side of the regenerative turbine impeller. A first fluid outlet is fluidically coupled to the first side of the regenerative turbine impeller. A second fluid inlet is fluidically coupled to the second side of the regenerative turbine impeller. A second fluid outlet is fluidically coupled to the second side of the regenerative turbine impeller.

15 Claims, 8 Drawing Sheets

REDUCING BEARING LOAD IN A REGENERATIVE TURBINE PUMP

TECHNICAL FIELD

This disclosure relates to regenerative turbine pumps.

BACKGROUND

Regenerative turbine pumps are mechanically similar to centrifugal pumps. Both pumps rotate an impeller in order to impart kinetic energy into a fluid flow; however, in a centrifugal pump, fluid only passes through a set of impeller vanes once. In a regenerative turbine pump, the fluid can "roll-over" the impeller vanes and can pass through multiple sets of impeller vanes multiple times before exiting the pump. That is, the fluid is not restricted to passing through a single set of vanes a single time like in a centrifugal pump. In a regenerative turbine pump, kinetic energy is transferred to the fluid with each vane pass and converted to potential energy (pressure). Such energy transfer mechanics allow a regenerative turbine pump to be mechanically as simple as a centrifugal pump, while having flow characteristics similar to a positive displacement pump. In other words, the fluid can pass over and through as many impeller vanes as needed until the fluid pressure is increased sufficiently to enter a downstream destination. This pressurized increase is gradual and reduces the risk for cavitation. As a result, regenerative turbine pumps are ideal for services where low net positive suction head is available. In other words, regenerative turbine pumps are resistant to cavitation. Rather than having a fluid inlet at an eye of the impeller, the fluid inlet and exit are both along a radial edge of the impeller.

In some instances, a regenerative turbine pump has impeller vanes on both faces of the impeller in order to increase an allowable flow rate. In such an instance, there is a substantially equal thrust load on both sides of the impeller, reducing or eliminating the need for a thrust bearing in a regenerative turbine pump. In some instances, hydrodynamic forces caused by fluid flowing through the impeller cause the impeller to self-center within the impeller housing.

SUMMARY

This disclosure describes technologies relating to reducing bearing loads in regenerative turbine pumps.

An example implementation of the subject matter described within this disclosure is a regenerative turbine pump with the following features. A regenerative turbine impeller includes a first side and a second side. An impeller housing surrounds the regenerative turbine impeller. The impeller housing includes a seal separating the first side and the second side of the regenerative turbine impeller. A first fluid inlet is fluidically coupled to the first side of the regenerative turbine impeller. A first fluid outlet is fluidically coupled to the first side of the regenerative turbine impeller. A second fluid inlet is fluidically coupled to the second side of the regenerative turbine impeller. A second fluid outlet is fluidically coupled to the second side of the regenerative turbine impeller.

Aspects of the example implementation, which can be combined with the example implementation alone or in part, include the following. The second fluid inlet is fluidically coupled to the first fluid outlet.

Aspects of the example implementation, which can be combined with the example implementation alone or in part, include the following. The first fluid inlet and the first fluid outlet are on a first side of the regenerative turbine pump. The second fluid inlet and the second fluid outlet are on a second side of the regenerative turbine pump. The second side is opposite the first side.

Aspects of the example implementation, which can be combined with the example implementation alone or in part, include the following. The regenerative turbine impeller is a first-stage regenerative turbine impeller. The regenerative turbine pump further includes a second-stage regenerative turbine impeller with a third side and a fourth side. A second-stage housing surrounds the second-stage regenerative turbine impeller. The second stage housing includes a third fluid inlet fluidically connected to the second regenerative turbine impeller and the second fluid outlet. A third fluid outlet is fluidically connected to the second regenerative turbine impeller. A shaft rotatably couples the first-stage regenerative turbine impeller and the second-stage regenerative turbine impeller.

Aspects of the example implementation, which can be combined with the example implementation alone or in part, include the following. The first stage housing and the second stage housing are at least partially fluidically isolated from one another by a housing seal.

Aspects of the example implementation, which can be combined with the example implementation alone or in part, include the following. The housing seal includes a labyrinth seal.

Aspects of the example implementation, which can be combined with the example implementation alone or in part, include the following. The seal is a first-stage seal. The second stage housing further includes a second-stage seal separating the third side and the fourth side of the second-stage regenerative turbine impeller. The third fluid inlet and third fluid outlet are fluidically connected to the third side. A fourth fluid inlet is fluidically connected to the third side of the second-stage regenerative turbine impeller. A fourth fluid outlet is fluidically connected to the fourth side of the second-stage regenerative turbine impeller.

Aspects of the example implementation, which can be combined with the example implementation alone or in part, include the following. The fourth fluid inlet is fluidically connected to the third fluid outlet.

An example implementation of the subject matter described within this disclosure is a method reducing bearing load in a pump with the following features. A fluid is flowed through a first regenerative turbine pump stage. The first regenerative pump stage has a first stage inlet and a first stage outlet on a first side of the pump. The fluid is directed from the first stage outlet to a second stage inlet. The second stage inlet is on a second side of the pump opposite the first side of the pump and across a shaft. The fluid is flowed through a second regenerative turbine pump stage. The second regenerative pump stage has the second stage inlet and a second stage outlet on the second side of the pump.

Aspects of the example method, which can be combined with the example method alone or in combination, include the following. The first stage and the second stage share a same impeller wheel. The first stage is a first side of the impeller wheel. The second stage is a second side of the impeller wheel.

Aspects of the example method, which can be combined with the example method alone or in combination, include the following. The impeller wheel is a first impeller wheel. A third stage and a fourth stage share a second impeller wheel. The third stage is a first side of the second impeller wheel. The third stage has a third-stage fluid inlet and a third-stage fluid outlet. The fourth stage is a second side of the second impeller wheel. The fourth stage is a fourth-stage fluid inlet and a fourth-stage fluid outlet. The second impeller wheel shares a shaft with the first impeller wheel. Prior to directing the fluid from the first stage outlet to a second stage inlet, the fluid is directed from the first stage outlet to the third-stage inlet. The fluid is flowed through the third stage. The third stage faces and is parallel to the first stage. The fluid is directed from a third stage outlet to fourth stage inlet. The fluid is flowed through the fourth stage. The fourth stage faces away from and is parallel to the first stage. the fluid is directed from fourth stage outlet to the second stage inlet.

Aspects of the example method, which can be combined with the example method alone or in combination, include the following. The third stage inlet and third stage outlet are on a third side of the pump. The fourth stage inlet and the fourth stage outlet are on a fourth side of the pump. The fourth side is opposite of the third side.

Aspects of the example method, which can be combined with the example method alone or in combination, include the following. The first side, the second side, the third side, and the fourth side are evenly spaced circumferentially along an outer surface of the regenerative turbine pump.

An example implementation of the subject matter described within this disclosure is a regenerative turbine pump with the following features. A first-stage regenerative turbine impeller is surrounded by a first-stage housing. The first-stage housing includes a first fluid inlet fluidically connected to the first regenerative turbine impeller. A first fluid outlet is fluidically connected to the first regenerative turbine impeller. The first fluid inlet and the first fluid outlet are positioned on a first side of the regenerative turbine pump. A second-stage regenerative turbine impeller is surrounded by a second-stage housing. The second stage housing includes a second fluid inlet fluidically connected to the second regenerative turbine impeller and the first fluid outlet. A second fluid outlet is fluidically connected to the second regenerative turbine impeller. A shaft rotatably couples the first-stage regenerative turbine impeller and the second-stage regenerative turbine impeller.

Aspects of the example implementation, which can be combines with the example implementation alone or in combination, include the following. The first-stage housing and the second-stage housing are at least partially fluidically isolated from one another by a housing seal.

Aspects of the example implementation, which can be combines with the example implementation alone or in combination, include the following. The housing seal includes a labyrinth seal.

Aspects of the example implementation, which can be combines with the example implementation alone or in combination, include the following. The first-stage housing further includes a seal that at least partially fluidically separates a first impeller side from a second impeller side on the first-stage impeller. The first fluid inlet is fluidically connected to the first side of the first-stage impeller. The first fluid outlet is fluidically connected to the second side of the first-stage impeller. A third fluid inlet is fluidically connected to the second side of the first-stage impeller. A third fluid outlet is fluidically connected to the second side of the first-stage impeller.

Aspects of the example implementation, which can be combines with the example implementation alone or in combination, include the following. The seal is a first seal. The second-stage housing further includes a second seal that at least partially fluidically separates a first impeller side from a second impeller side on the second-stage impeller. The second fluid inlet is fluidically connected to the first side of the second-stage impeller. The first fluid outlet is fluidically connected to the second side of the second-stage impeller. A fourth fluid inlet is fluidically connected to the second side of the second-stage impeller. A fourth fluid outlet is fluidically connected to the second side of the first-stage impeller.

Aspects of the example implementation, which can be combines with the example implementation alone or in combination, include the following. The first fluid inlet and first fluid inlet are on a first side of the regenerative turbine pump. The second fluid inlet and the second fluid outlet are on a second side of the regenerative turbine pump. The third fluid inlet and the third fluid outlet are one a third side of the regenerative turbine pump. The fourth fluid inlet and the fourth fluid outlet are on a fourth side of the regenerative turbine pump. The first side, the second side, the third side, and the fourth side are evenly spaced circumferentially along an outer surface of the regenerative turbine pump.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

As regenerative turbine pumps can have a significant increase in pressure across a single impeller, radial loads on radial bearings within the pump can be higher than those experienced by corresponding radial bearings of a centrifugal pump. As pressure builds within the impeller chamber, a non-uniform pressure distribution results. For example, the pressure at an inlet of the impeller is lower than the pressure at the outlet of the impeller. This excess radial load can result in pre-mature bearing failure, or the need for larger, more expensive bearings.

This disclosure describes a regenerative turbine pump with a first side of an impeller that is fluidically separated from a second side of the impeller by a seal within the housing. This separation allows each side of the impeller to act as a separate pump stage. An inlet and outlet to the first pump stage are located on opposite sides of the housing from the inlet and outlet of the second pump stage. Having the inlets/outlets on the opposite sides of the housing allows the radial load to at least partially cancel each other out and reduce the radial bearing load. In some implementations, a similar approach can be used with two impeller wheels in series. While the implementations described within this disclosure include one or two impeller wheels, more impeller wheels can be used without departing from the scope of this disclosure. While the term "pump" is used throughout this disclosure, the subject matter can be applied to compressors and mixed flow applications as well.

Figure 1A:
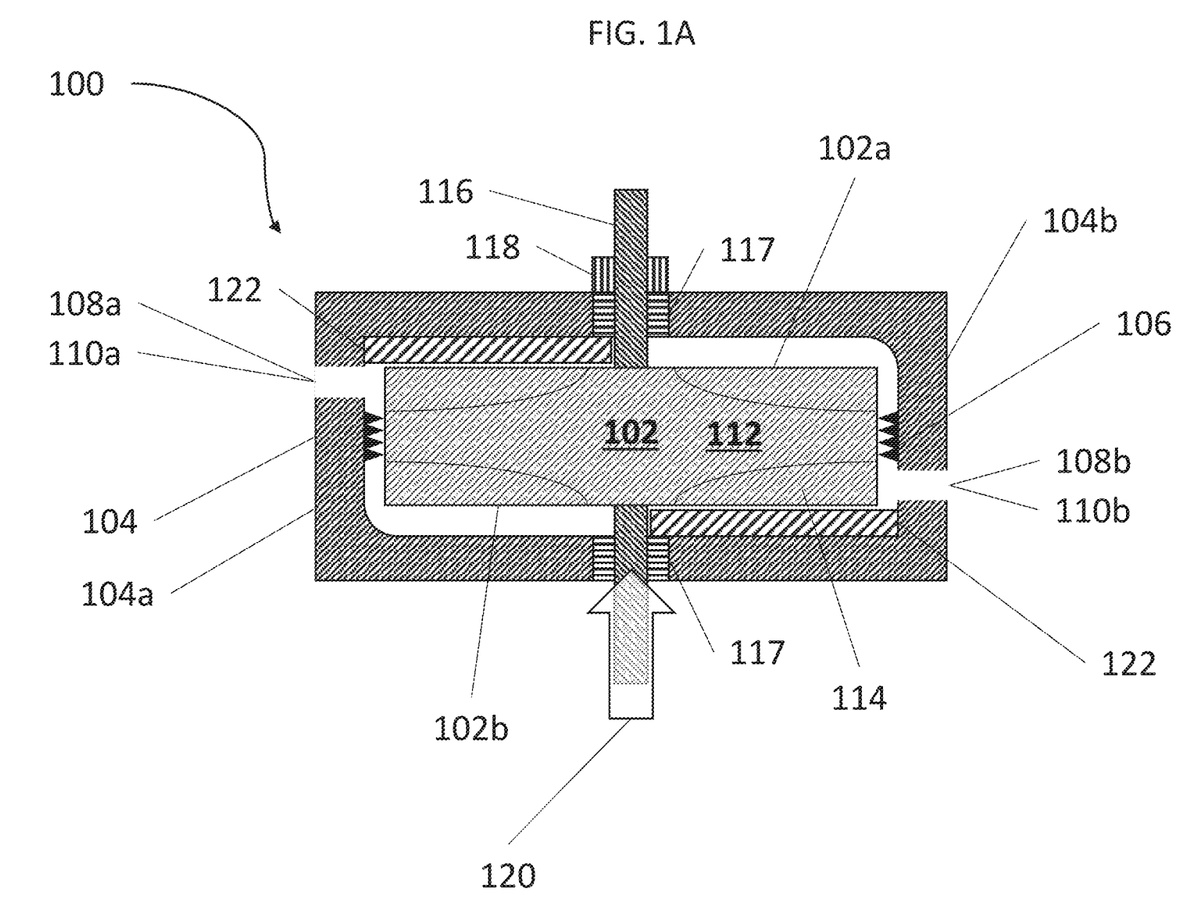
FIG. 1A is a side, half cross-sectional view of an example regenerative turbine pump impeller and housing.
Figure 1B:
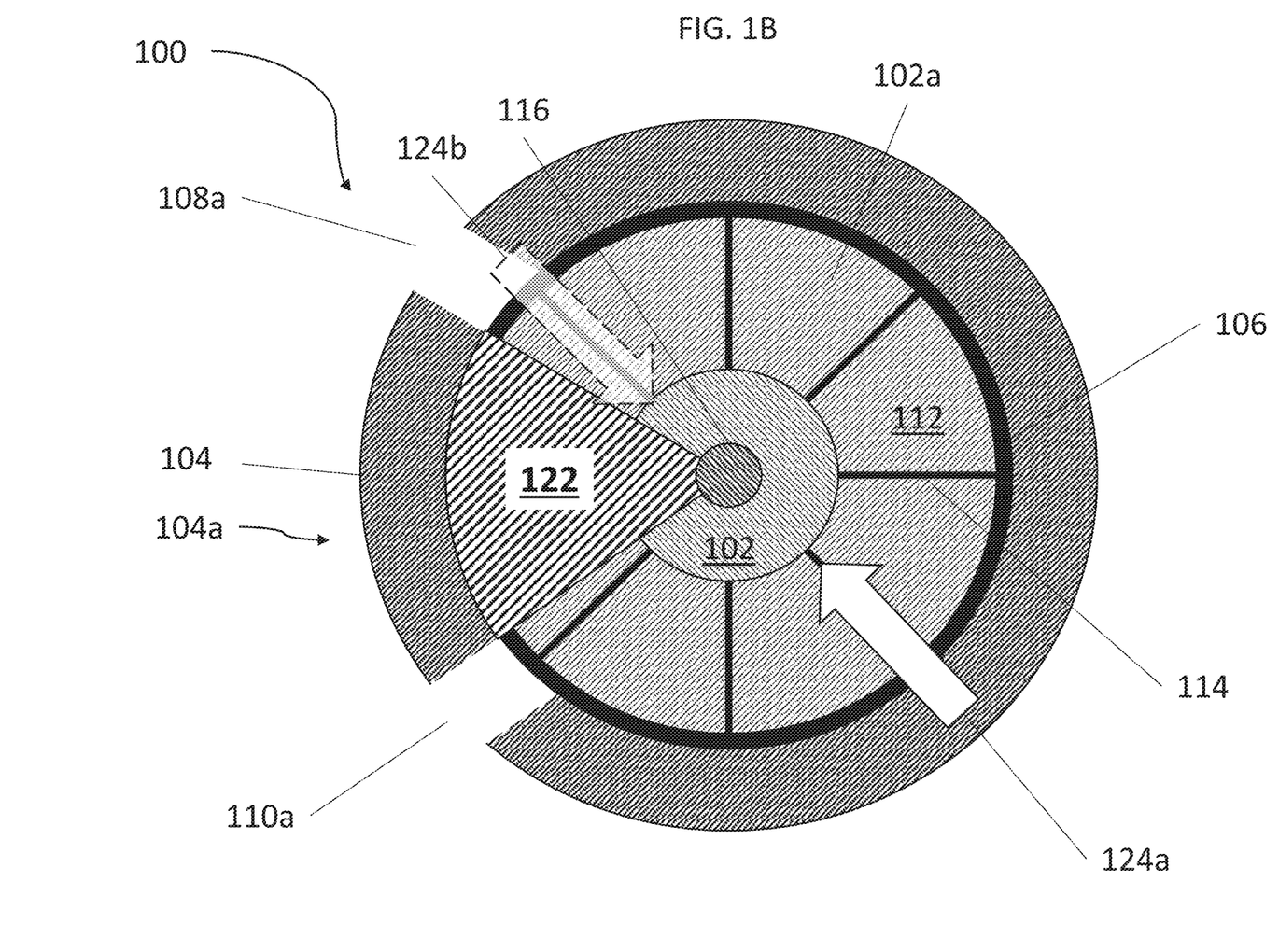
FIG. 1B is a top, half cross-sectional view of an example regenerative turbine pump impeller and housing.

FIGS. 1A-1B, show side and top half cross-sectional views of an example regenerative turbine pump 100. The regenerative turbine pump 100 includes a regenerative turbine impeller 102 including a first side 102a and a second side 102b. An impeller housing 104 surrounds the regenerative turbine pump 100. The impeller housing includes a seal 106 that at least partly fluidically separates the first side 102a and the second side 102b of the regenerative turbine impeller 102. While the illustrated implementation shows the seal 106 as a labyrinth seal, other seals, such as a carbon ring seal, can also be used.

The impeller 102 includes a wheel body 112 and vanes 114 that extend radially out from a central part of the impeller 102. In some implementations, the vanes 114 are straight and have little to no curve (radially or axially). In some implementations, the vanes 114 are curved (radially or axially) to improve efficiency. In some instances, the wheel body 112 and the vanes 114 are flush with one another. That is, an edge of the wheel body 112 can be in-line and flush with an edge of a vane 114.

The impeller 102 is rotated by a shaft 116 that extends into the housing 104. While the illustrated implementation shows a between-bearing pump design, the subject matter described within can be equally applied to an overhung pump. The shaft is radially supported by one or more radial bearings 117. Each radial bearing 117 can include a mechanical radial bearing or a magnetic radial bearing. In the instance where a magnetic radial bearing is used, the magnetic bearing can include an active or passive magnetic radial bearing. In instances where a mechanical radial bearing is used, the mechanical radial bearing can include a fluid-film radial bearing or an antifriction radial bearing. The radial bearings can be either sealed or unsealed. While the illustrated implementation is designed to reduce a net radial load on the radial bearings 117, this implementation can produce an increased thrust load 120 if there is a pressure differential between the first side 102a and the second side 102b. As a result, a thrust bearing 118 is included in the illustrated implementation. The thrust bearing 118 can include a mechanical thrust bearing or a magnetic thrust bearing. In instances where a magnetic thrust bearing is used, the magnetic thrust bearing can be an active magnetic thrust bearing or a passive magnetic thrust bearing. In instances where a mechanical thrust bearing is used, the mechanical thrust bearing can include a fluid film thrust bearing or an anti-friction thrust bearing.

The housing 104 includes a first fluid inlet 108a fluidically coupled to the first side 102a of the regenerative turbine impeller 102. The housing 104 also includes a first fluid outlet 110a fluidically coupled to the first side 102a of the regenerative turbine impeller 102. A second fluid inlet 108b is fluidically coupled to the second side 102b of the regenerative turbine impeller 102. The housing also includes a second fluid outlet 110b fluidically coupled to the second side 102b of the regenerative turbine impeller 102. Each inlet and outlet pair is separated from one-another by a divider 122. The divider 122 separates each inlet from each outlet and can include an obstruction that has an inner edge that defines a tight clearance with an upper/lower edge of the impeller 102. Such a tight clearance reduces or eliminates fluid flow across the divider 122 between the inlet and outlet. The divider 122 can be a plate or liner of any shape sufficient to prevent cross-flow within the regenerative turbine pump 100. While the divider 122 is illustrated as a circular sector with a rectangular cross-section, other shapes can be used with equal efficacy.

The first fluid inlet 108a and the first fluid outlet 110a are on a first side 104a of the regenerative turbine pump 100, while the second fluid inlet 108b and the second fluid outlet 110b are on a second side 104b of the regenerative turbine pump 100. As illustrated, the second side 104b is opposite the first side 104a. That is, the first fluid inlet 108a and the first fluid outlet 110a are on a first side 104a of the pump housing (radially) and are fluidically connected to a first impeller side 102a (axially), while the second fluid inlet 108b and the second fluid outlet 110b are on a second side 104b of the pump housing (radially) and are fluidically connected to a second impeller side 102b (axially). The first fluid inlet 108a and outlet 110a being on opposite sides of the housing 104 from the second fluid inlet 108b and 110b allows for separate opposite radial loads to be applied to the radial bearings. For example, a first radial load 124 is produced as fluid flows across an upper side 102a of the impeller 102. A second radial load 124b is produced as fluid flows across a lower side 102b of the impeller 102. The first radial load 124a and the second radial load 124b are in opposite directions and counter-act one another. In some implementations, the first radial load 124a and the second radial load 124b do not have an equal magnitude, but the net force produced by the two radial loads is still less than either single radial load. In some instances, the first radial load 124a and the second radial load 124b are equal in magnitude.

Figure 2:
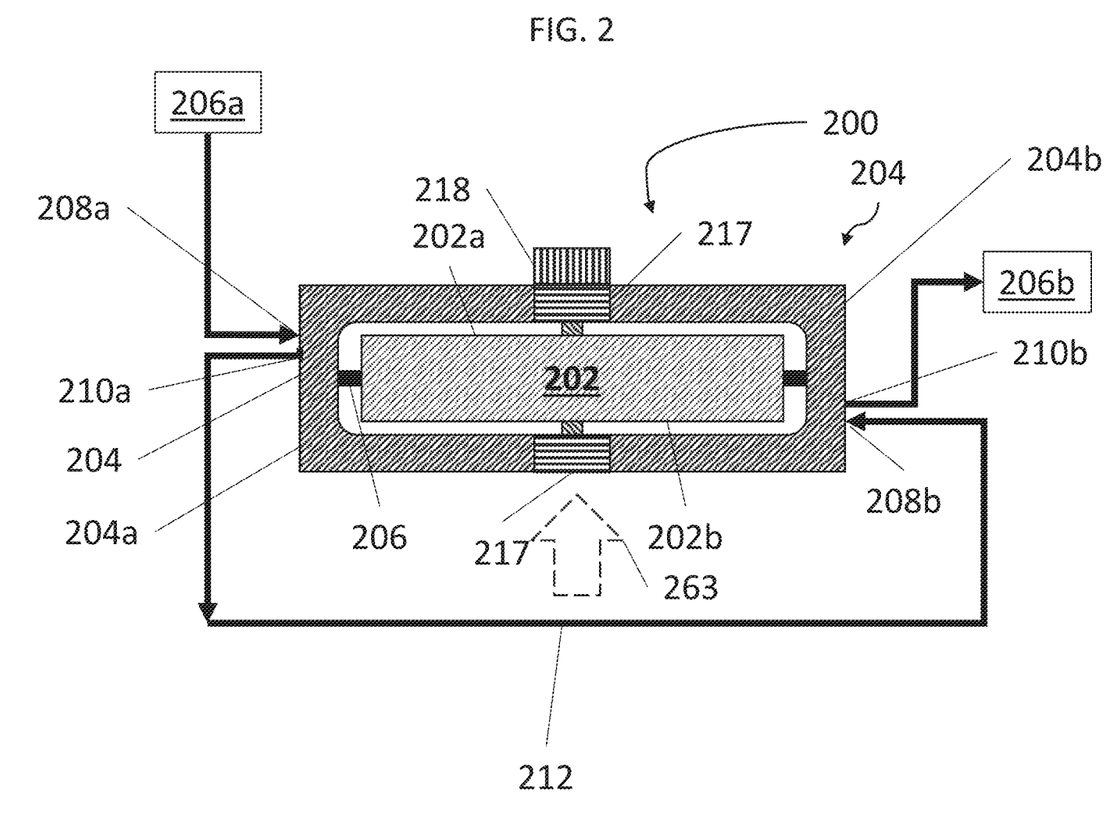
FIG. 2 is a schematic diagram of an example regenerative turbine pump with marked flow paths.

FIG. 2 is an example implementation of a regenerative turbine pump 200 that is similar to the regenerative turbine pump 100 discussed in FIGS. 1A-1B that is piped into an example system. In the illustrated implementation, fluid flows from a fluid source 206a into a first inlet 208a. The fluid can include a liquid, a gas, or a mixture of liquid and gas. The fluid then passes through a housing 204 along a first side 202a of an impeller 202 and out through the first fluid outlet 210a. As illustrated, the first fluid outlet 210a is fluidically coupled to a second fluid inlet 208b. In such an implementation, the fluid flows from the first fluid outlet 210a, into the second fluid inlet 208b. In other words, there is a defined flow path between the first fluid outlet, through a flow connection 212, and through the second fluid inlet 108b into the housing 204. The fluid then passes through the housing 204 along a second side 202b of the impeller 202 and out the second fluid outlet 210b. The first side 202a of the impeller 202 is at least partially fluidically isolated from the second side 202b by the seal 206. That is, there is little to no flow across the seal between the first side 202a of the impeller 202 and the second side 202b of the impeller 202. The first side 202a and the second side 202b of the impeller 202 can essentially be considered two separate pump stages in this implementation. The illustrated implementation produces counter-acting radial loads to reduce a net radial load on the radial bearings 217, but can result in an additional thrust load 263 that can be accommodated by a thrust bearing 218. While the illustrated example shows fluid flowing from the first side 202a to the second side 202b of the impeller 202, each side can potentially draw fluid from different sources and feed the fluid to two different destinations.

Figure 3A:
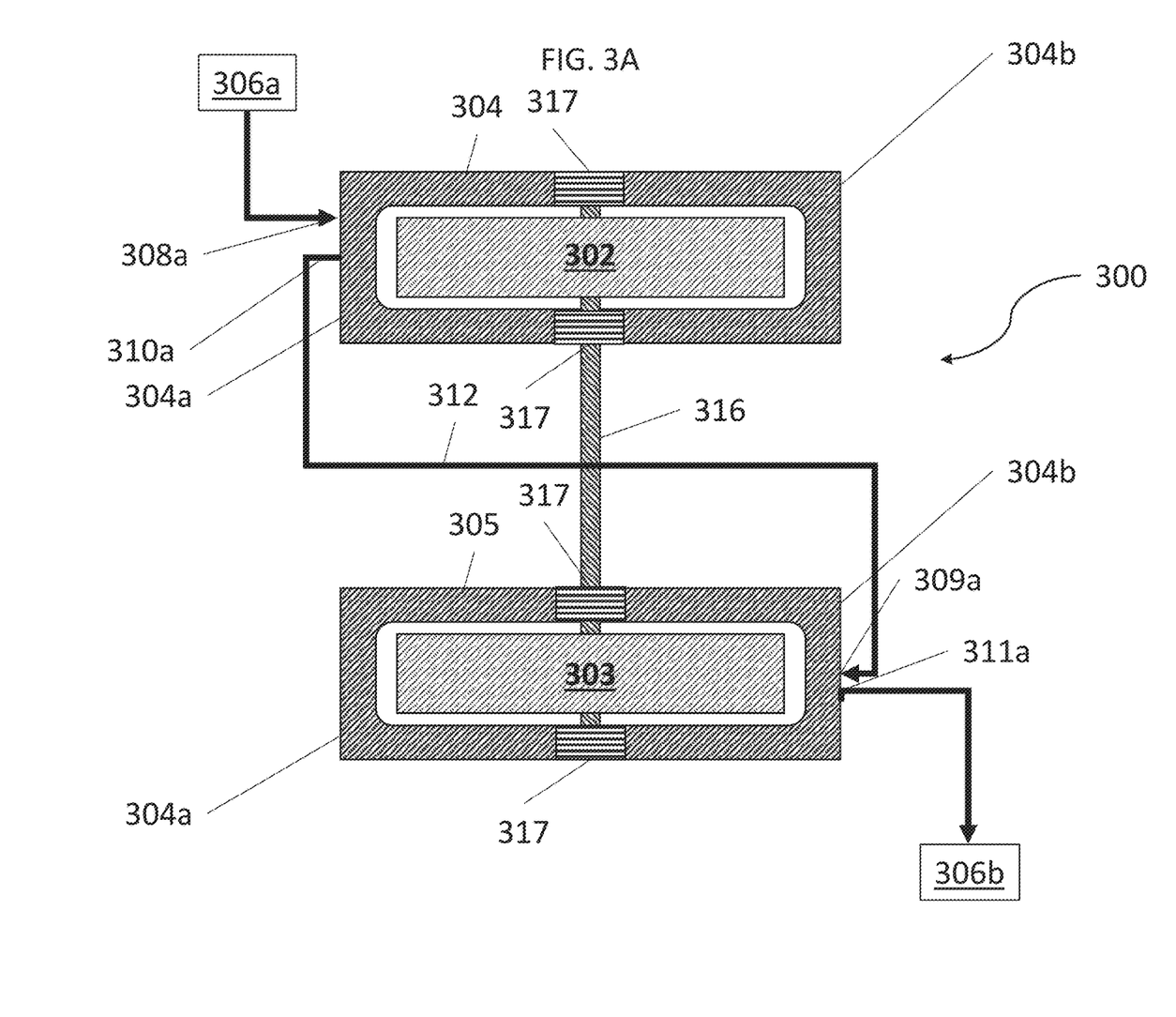
FIG. 3A is a schematic diagram of an example regenerative turbine pump with marked flow paths.

FIG. 3A illustrates an implementation of a regenerative turbine pump 300 with both a first-stage regenerative turbine impeller 302 and a second-stage regenerative turbine impeller 303. A first-stage housing 304 surrounds the first regenerative turbine impeller 302. The first-stage housing includes a first fluid inlet 308a and a first fluid outlet 310a. Both the first fluid inlet 308a and the first fluid outlet 310a are fluidically connected to the first stage impeller 302. That is, they define a flow path into and out of the first-stage housing 304.

A second-stage housing 305 surrounds the second-stage regenerative turbine impeller 303. The second-stage housing 305 includes a second fluid inlet 309a fluidically connected to the second regenerative turbine impeller 303 and, as illustrated, the first fluid outlet 310a. In other words, there is a defined flow path between the first fluid outlet 310a, through a flow connection 312, and through the second flow inlet to the second stage impeller 303. A second fluid outlet 311a is fluidically connected to the second regenerative turbine impeller 303.

A shaft 316 rotatably couples the first-stage regenerative turbine impeller 302 and the second-stage regenerative turbine impeller 303. In such an application, the first-stage impeller 302 and the second-stage impeller 303 can be driven by a single driver, such as a motor or gas-turbine (not shown).

The first fluid inlet 308a and the first fluid outlet 310a are positioned on a first side 304a of the regenerative turbine pump housing (304 and 305), while the second fluid inlet 309a and the second fluid outlet 311a are on a second side 304b of the regenerative turbine pump housing (304 and 305). In other words, the first inlet 308a and the first fluid outlet 310a are diametrically opposite the second fluid inlet 309a and the second fluid outlet 311a on an outer circumference of the pump housing (304 and 305). In some implementations, the first inlet 308a and the first fluid outlet 310a are not a full 180° from the second fluid inlet 309a and the second fluid outlet 311a, but they should be sufficiently opposite to achieve the desired result. Even with two separate impeller wheels (302 and 303), having a first set of inlets and outlets along an opposite side of a second set of inlets and outlets results in opposite radial loads that at least partially cancel out one-another similar to the loads shown in FIGS. 1A-1B. That is, counter-acting radial loads are produced that reduce a radial load on the radial bearings 317. In the illustrated implementation, since both sides of the first-stage impeller wheel 302 and both sides of the second-stage impeller wheel 303 are used with no seal separating them, little to no thrust load is produced, reducing the need for a thrust bearing in this implementation. In other words, the lack of a seal allows both sides of each impeller wheel to have a substantially equal pressure distribution, resulting in little to no net thrust force.

Figure 3B:
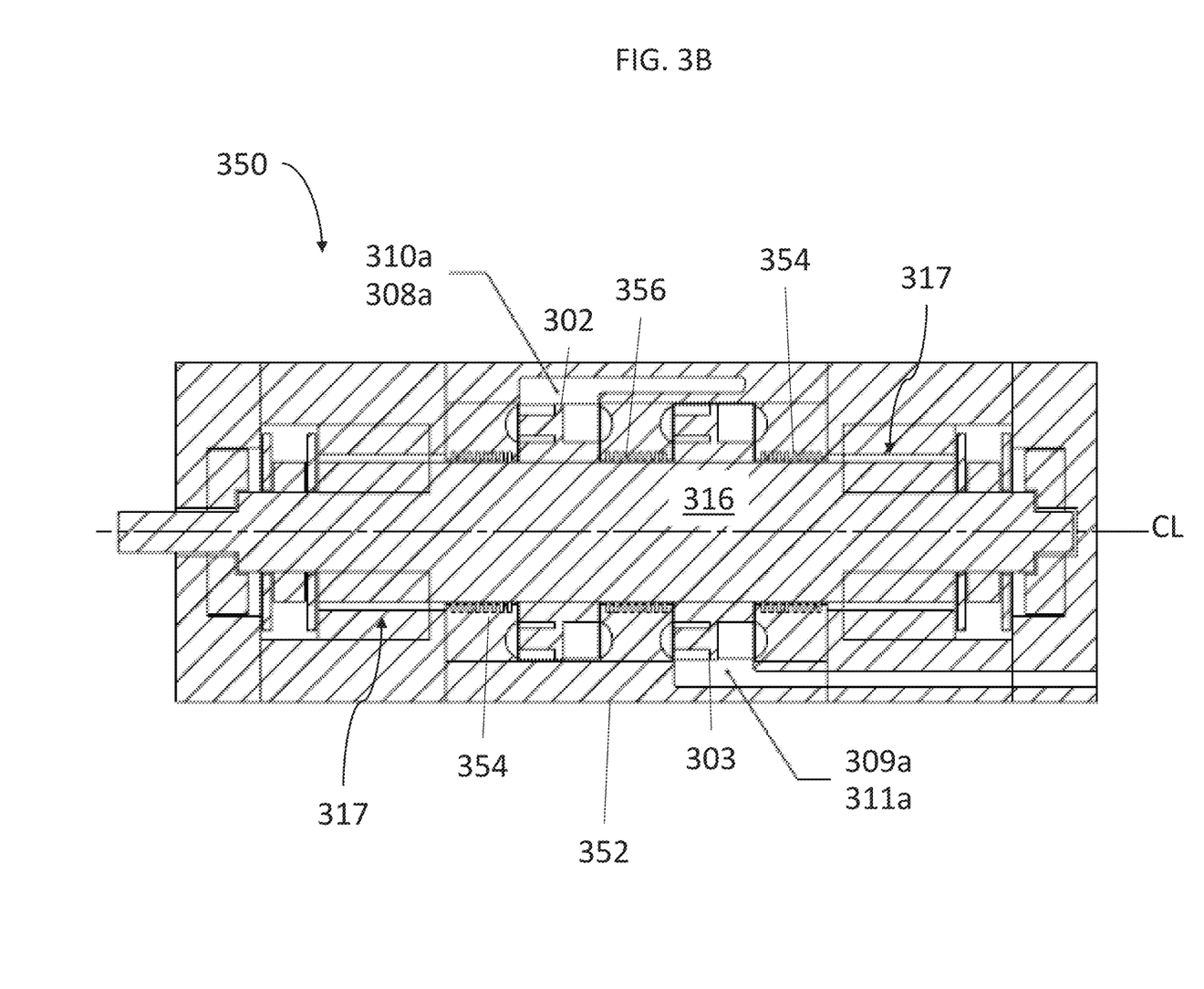
FIG. 3B is a schematic diagram of an example regenerative turbine pump.

FIG. 3B illustrates an implementation of a regenerative turbine pump 350 with both a first-stage regenerative turbine impeller 302 and a second-stage regenerative turbine impeller 303 sharing a same housing 352. In such an implementation, the first-stage impeller 302 and the second-stage impeller 304 are separated by a housing seal 356. The housing seal 356, as illustrated, includes a labyrinth seal. In some implementations, the housing seal 356 can include a carbon ring seal, or any other type of seal suitable for the application. As illustrated, the radial bearings are sealed from the process fluid by seal 354. The seals 354 can include a labyrinth seal, a carbon ring seal, or any other type of seal suitable for the application. Each radial bearings 317 can include a mechanical radial bearing or a magnetic radial bearing. In the instance where a magnetic radial bearing is used, the magnetic bearing can include an active or passive magnetic radial bearing. In instances where a mechanical radial bearing is used, the mechanical radial bearing can include a fluid-film radial bearing or an antifriction radial bearing.

Figure 4A:
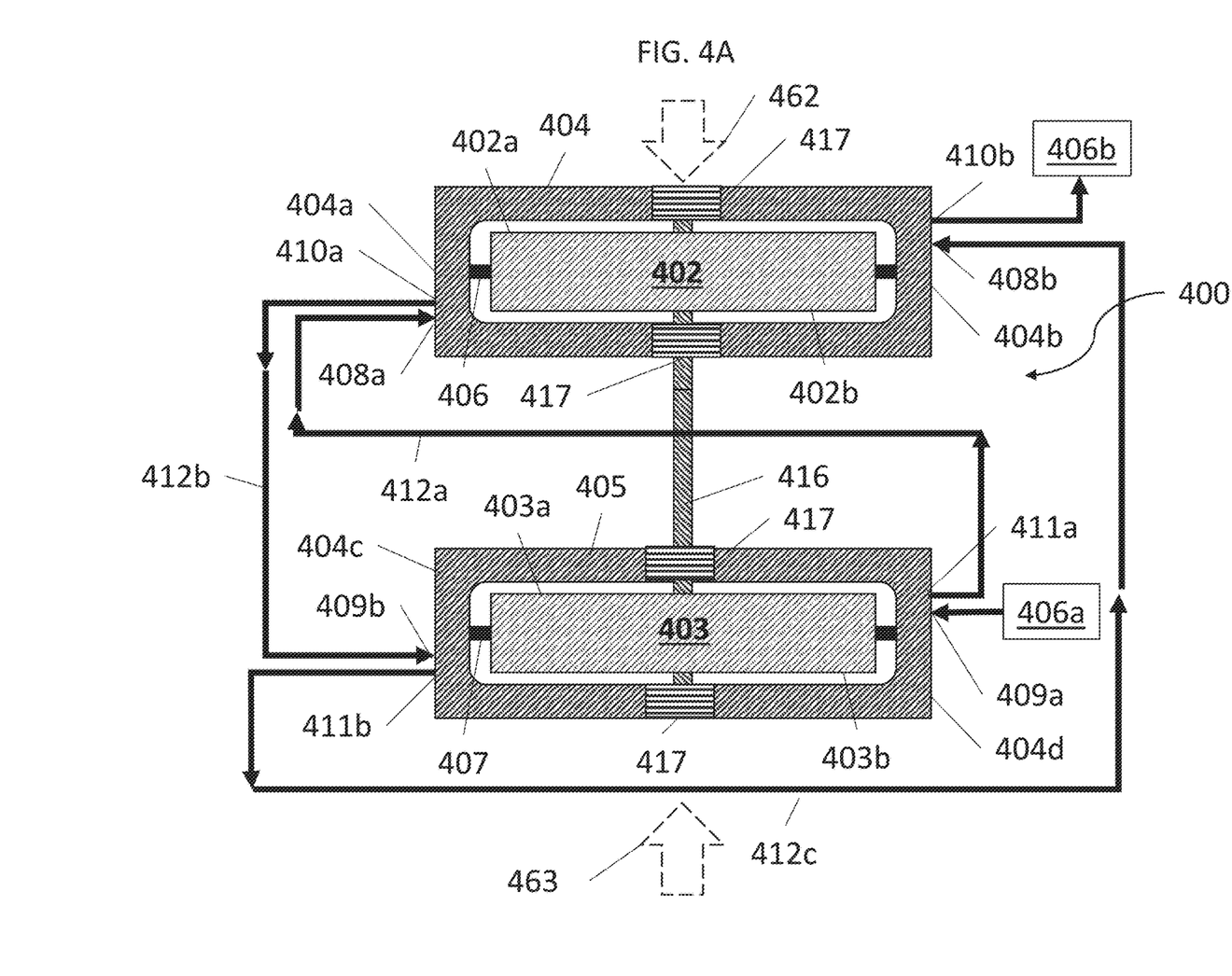
FIG. 4A is a side view schematic diagram of an example regenerative turbine pump with marked flow paths.

FIG. 4A is a side half cross sectional view of an example regenerative turbine pump 400. In this implementation, the regenerative turbine pump 400 include seals separating each side of individual impellers. The regenerative pump 400 includes both a first-stage regenerative turbine impeller 402 and a second-stage regenerative turbine impeller 403. A first-stage housing 404 surrounds the first regenerative turbine impeller 402. The first-stage housing 404 includes a first fluid inlet 408a and a first fluid outlet 410a. Both the first fluid inlet 408a and the first fluid outlet 410a are fluidically connected to a first side 402a of the first stage impeller 402. That is, they define a flow path into and out of the first stage housing 404 along the first side 402a of the first stage impeller 402. The first-stage housing 404 also includes a second fluid inlet 408b and a second fluid outlet 410b. Both the second fluid inlet 408b and the second fluid outlet 410b are fluidically connected to a second side 402b of the first stage impeller 402. That is, they define a flow path into and out of the first stage housing 404 along the second side 402b of the first stage impeller 402.

The second-stage housing 405 surrounds the second regenerative turbine impeller 403. The second-stage housing 405 includes a third fluid inlet 409a and a third fluid outlet 411a. Both the third fluid inlet 409a and the third fluid outlet 411a are fluidically connected to a first side 403a of the second-stage impeller 403. That is, they define a flow path into and out of the second stage housing 405 along the first side 403a of the second stage impeller 403. The second-stage housing 405 also includes a fourth fluid inlet 409b and a fourth fluid outlet 411b. Both the fourth fluid inlet 409b and the fourth fluid outlet 411b are fluidically connected to a second side 403b of the second stage impeller 403. That is, they define a flow path into and out of the second stage housing 405 along the second side 403b of the second stage impeller 403.

A shaft 416 rotatably couples the first-stage regenerative turbine impeller 402 and the second-stage regenerative turbine impeller 403. In such an application, the first-stage impeller 402 and the second-stage impeller 403 can be driven by a single driver, such as a motor or gas-turbine (not shown). In some implementations, separate drivers can be used to individually drive the first-stage regenerative turbine impeller 402 and the second-stage regenerative turbine impeller 403.

The first side 402a of the impeller 402 is at least partially fluidically isolated from the second side 402b by the seal 406, while the first side 403a of the impeller 403 is at least partially fluidically isolated from the second side 403b by the seal 407. Each side of each impeller, the first side 402a and the second side 402b of the impeller 402, the first side 403a and the second side 403b of the impeller 403, can essentially be considered four separate pump stages in this implementation. While the illustrated example shows a particular flow path, each impeller side can potentially draw fluid from different sources and feed the fluid to different destinations. While a specified fluid route through specified stages is given in this disclosure, other routes are possible without deviating from this disclosure.

In the illustrated implementation, fluid flows from a fluid source 406a into the third inlet 409a. The fluid then passes through a housing 405 along a first side 403a of a second stage impeller 403 and out the fluid outlet 411a. As illustrated, the third fluid outlet 411a is fluidically coupled to a first fluid inlet 408a. In such an implementation, the fluid flows from the third fluid outlet 411a, into the first fluid inlet 408a. In other words, there is a defined flow path between the third fluid outlet 411a, through a flow connection 412a, and through the first fluid inlet 108a into the housing 404. The fluid then passes through the housing 404 along a second side 402b of the impeller 402 and out the first fluid outlet 410a.

The first fluid outlet 410a is fluidically coupled to a fourth fluid inlet 409b. In such an implementation, the fluid flows from the first fluid outlet 410a, into the fourth fluid inlet 409b. In other words, there is a defined flow path between the first fluid outlet 410a, through a flow connection 412b, and through the fourth flow inlet 109b into the housing 405. The fluid then passes through the housing 405 along a second side 403b of the impeller 403 and out the fourth fluid outlet 411b.

The fourth fluid outlet 411b is fluidically coupled to a second fluid inlet 408b. The fluid flows from the fourth fluid outlet 411b, into the second fluid inlet 408b. In other words, there is a defined flow path between the third fluid outlet 411b, through a flow connection 412c, and through the second fluid inlet 108b into the housing 404. The fluid then passes through the housing 404 along a first side 401b of the impeller 402 and out the second fluid outlet 410b towards a fluid user 406b.

While a particular flow path has been previously described, other flow paths can be used without departing from the subject matter described herein. For example, the fluid flow can flow from the fluid source 406a to a first side of the first impeller 402. The fluid can then flow from the first side of the first impeller to the second side of the first impeller 403. The fluid can then flow from the second side of the first impeller 402 to the second side of the second impeller 403. The fluid can then flow from the second side of the second impeller 403 to the first side of the second impeller 403. The fluid can then flow from the first side of the second impeller to the fluid user 406b. Other flow paths that reduce a thrust load on the regenerative turbine pump can be used.

Figure 4B:
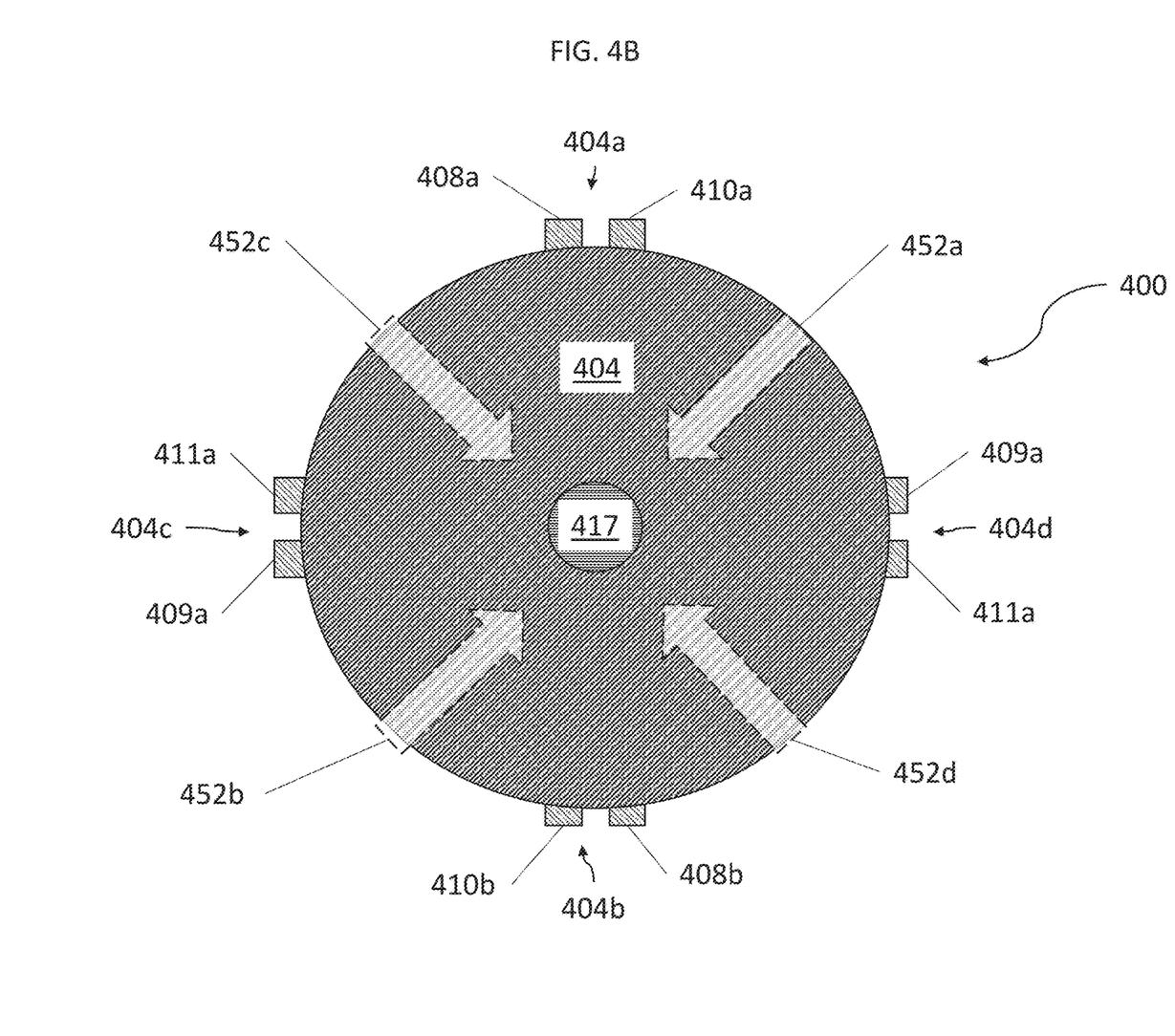
FIG. 4B is a top view schematic diagram of an example regenerative turbine pump.

As shown in FIG. 4B, the first fluid inlet 408a and the first fluid outlet 410a are positioned on a first side 404a of the regenerative turbine pump housing 404, the second fluid inlet 408b and the second fluid outlet 410b are on a second side 404b of the regenerative turbine pump housing 404, the third fluid inlet 409a and the third fluid outlet 411a are positioned on a third side 404c of the regenerative turbine pump housing 404, and the fourth fluid inlet 409b and the fourth fluid outlet 411b are on a fourth side 404d of the regenerative turbine pump housing 404.

Even with two separate impeller wheels (402 and 403) having a first set of inlets and outlets along an opposite side of a second set of inlets and outlets for each wheel results in opposite radial loads that at least partially cancel one another out similar to the loads shown in FIGS. 1A-1B. For example, in FIG. 4B, a first radial force 452a against a radial bearing 417 that is produced by an uneven pressure distribution along a first side 402a of the first impeller 402 is counter-acted by a second radial force 452b against the radial bearing 417 that is produced by an uneven pressure distribution along a second side 402b of the first impeller 402. Similarly, a third radial force 452c against the radial bearing 417 that is produced by an uneven pressure distribution along a first side 403a of the second impeller 403 is counter-acted by a fourth radial force 452d against the radial bearing 417 that is produced by an uneven pressure distribution along a second side 403b of the second impeller 403. In some implementations, the first side 404a of the pump housing 404 is opposite the second side 404b of the pump housing 404 while the third side 404c of the pump housing 404 is opposite the fourth side 404d of the pump housing 404. In some implementations, the first side 404a of the pump housing 404, the second side 404b of the pump housing 404, the third side 404c of the pump housing 404, and the fourth side 404d of the pump housing 404 are evenly spaced circumferentially along an outer surface of the regenerative turbine pump 400.

In the illustrated implementation, since both sides of the first-stage impeller wheel 402 and both sides of the second-stage impeller wheel 403 are used while being fluidically isolated from one another, a thrust load is produced by each stage. That is, a pressure differential across two sides of a single impeller results in a thrust force. In order to reduce the net thrust load, the pump impellers can be staged such that a first thrust load 462 and a second thrust load 463 counter-act one another. Such a configuration reduces or eliminates the need for a thrust bearing in this implementation.

Figure 5:
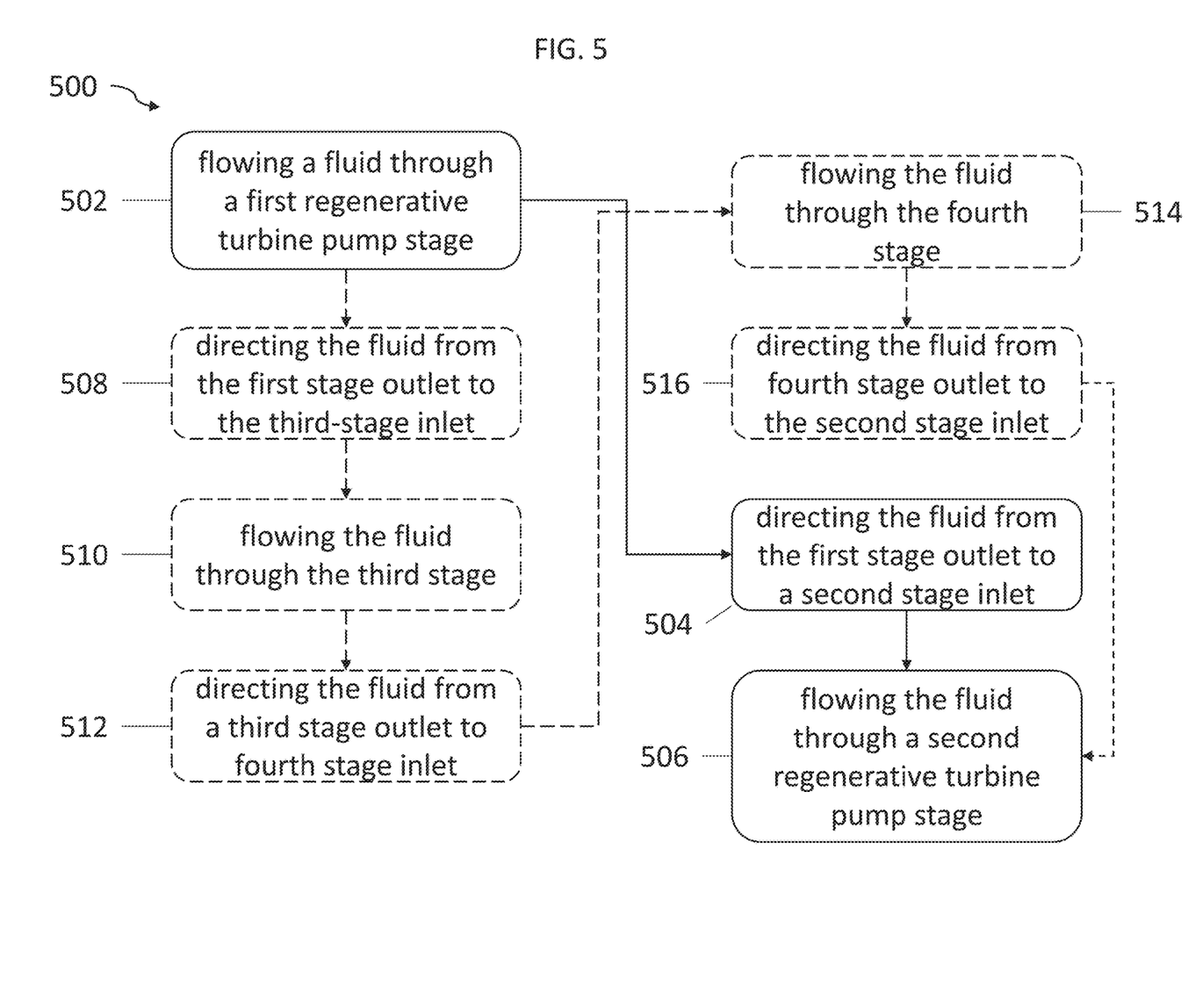
FIG. 5 is a flowchart of an example method that can be used with aspects of this disclosure.

FIG. 5 is a flowchart of an example method 500 that can be used with aspects of this disclosure. At 502, a fluid is flowed through a first regenerative turbine pump stage. The first regenerative pump stage has a first stage inlet and a first stage outlet on a first side of the pump. At 504, the fluid is directed from the first stage outlet to a second stage inlet. The second stage inlet is on a second side of the pump opposite the first side of the pump and across a shaft. At 506, the fluid is flowed through a second regenerative turbine pump stage. The second regenerative pump stage has a second stage inlet and a second stage outlet on the second side of the pump.

In some implementations, prior to directing the fluid from the first stage outlet to a second stage inlet, at 508, the fluid is directed from the first stage outlet to a third-stage inlet, for example, through a pipe due to an outlet pressure at the first stage outlet. At 510, the fluid is flowed through the third stage. The third stage faces and is parallel to the first stage. At 512, the fluid is directed from a third stage outlet to a fourth stage inlet. At 514, the fluid is flowed through the fourth stage. The fourth stage is parallel and faces away from the first stage. At 516, the fluid is directed from the fourth stage outlet to the second stage inlet.

In some implementations, the first stage and the second stage share a same impeller wheel. That is, the first stage is a first side of the impeller wheel, and the second stage is a second side of the impeller wheel. In some implementations, a third stage and a fourth stage share a second impeller wheel. The third stage is a first side of the second impeller wheel. The third stage has a third-stage fluid inlet and a third-stage fluid outlet. The fourth stage is a second side of the second impeller wheel. The fourth stage has a fourth-stage fluid inlet and a fourth-stage fluid outlet. In some implementations. The second impeller wheel shares a shaft with the first impeller wheel. While the subject matter described within this discloser has been described in relationship to a pump, aspects of this disclosure can be applied to a compressor or mixed-flow compressor without departing from this disclosure. While implementations with one or two impellers have been described in this disclosure, more impellers can be used without departing from this disclosure.

While this disclosure contains many specific implementation details, these should not be construed as limitations on the scope of what may be claimed, but rather as descriptions of features specific to particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations, and it should be understood that the described components and systems can generally be integrated together in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A regenerative turbine pump comprising:
   a regenerative turbine impeller comprising a first axial side and a second axial side;
   an impeller housing that surrounds the regenerative turbine impeller, the impeller housing comprising:
      a seal separating the first axial side and the second axial side of the regenerative turbine impeller;
      a first fluid inlet fluidically coupled to the first axial side of the regenerative turbine impeller;
      a first fluid outlet fluidically coupled to the first axial side of the regenerative turbine impeller;
      a second fluid inlet fluidically coupled to the second axial side of the regenerative turbine impeller; and
      a second fluid outlet fluidically coupled to the second axial side of the regenerative turbine impeller, wherein the first fluid inlet and the first fluid outlet are on a first circumferential side of the regenerative turbine pump, while the second fluid inlet and the second fluid outlet are on a second circumferential side of the regenerative turbine pump, the second circumferential side being opposite the first circumferential side.

2. The regenerative turbine pump of claim 1, wherein the second fluid inlet is fluidically coupled to the first fluid outlet.

3. The regenerative turbine pump of claim 1, wherein the regenerative turbine impeller is a first-stage regenerative turbine impeller, wherein the impeller housing is a first-stage housing, the regenerative turbine pump further comprising:
   a second-stage regenerative turbine impeller comprising a third side and a fourth side;
   a second-stage housing surrounding the second-stage regenerative turbine impeller, the second-stage housing comprising:
      a third fluid inlet fluidically connected to the second-stage regenerative turbine impeller and the second fluid outlet;
      a third fluid outlet fluidically connected to the second-stage regenerative turbine impeller; and
   a shaft rotatably coupling the first-stage regenerative turbine impeller and the second-stage regenerative turbine impeller.

4. The regenerative turbine pump of claim 3, wherein the first: stage housing and the second-stage housing are at least partially fluidically isolated from one another by a housing seal.

5. The regenerative turbine pump of claim 4, wherein the housing seal includes a labyrinth seal.

6. The regenerative turbine pump of claim 3, wherein the seal is a first-stage seal, the second-stage housing further comprising:
   a second-stage seal separating the third side and the fourth side of the second-stage regenerative turbine impeller, the third fluid inlet and third fluid outlet fluidically connected to the third side;
   a fourth fluid inlet fluidically connected to the third side of the second-stage regenerative turbine impeller; and
   a fourth fluid outlet fluidically connected to the fourth side of the second-stage regenerative turbine impeller.

7. The regenerative turbine pump of claim 6, wherein the fourth fluid inlet is fluidically connected to the third fluid outlet.

8. The regenerative turbine pump of claim 1, wherein the seal surrounds a periphery of the impeller.

9. The regenerative turbine pump of claim 1, wherein the first axial side of the impeller comprises a first set of impeller blades along a periphery of the impeller, and the second axial side of the impeller includes a second set of impeller blades along the periphery of the impeller, the seal being between the first set of impeller blades and the second set of impeller blades.

10. A regenerative turbine pump comprising:
    a first-stage regenerative turbine impeller;
    a first-stage housing surrounding the first-stage regenerative turbine impeller, the first-stage housing comprising:
       a first fluid inlet fluidically connected to the first-stage regenerative turbine impeller; and
       a first fluid outlet fluidically connected to the first-stage regenerative turbine impeller, the first fluid inlet and the first fluid outlet being positioned on a first circumferential side of the regenerative turbine pump;
    a second-stage regenerative turbine impeller;
    a second-stage housing surrounding the second-stage regenerative turbine impeller, the second-stage housing comprising:
       a second fluid inlet fluidically connected to the second-stage regenerative turbine impeller and the first fluid outlet; and
       a second fluid outlet fluidically connected to the second-stage regenerative turbine impeller, wherein the second fluid inlet and the second fluid outlet are on a second circumferential side of the regenerative turbine pump, the second circumferential side being opposite the circumferential first side; and
    a shaft rotatably coupling the first-stage regenerative turbine impeller and the second-stage regenerative turbine impeller.

11. The regenerative turbine pump of claim 10, wherein the first-stage housing and the second-stage housing are at least partially fluidically isolated from one another by a housing seal.

12. The regenerative turbine pump of claim 11, wherein the housing seal includes a labyrinth seal.

13. The regenerative turbine pump of claim 10, wherein the first-stage housing further comprises:

- a seal that at least partially fluidically separates a first axial impeller side from a second axial impeller side on the first-stage regenerative turbine impeller, wherein the first fluid inlet is fluidically connected to the first axial side of the first-stage regenerative turbine impeller, wherein the first fluid outlet is fluidically connected to the second axial side of the first-stage regenerative turbine impeller;
- a third fluid inlet fluidically connected to the second axial side of the first-stage regenerative turbine impeller; and
- a third fluid outlet fluidically connected to the second axial side of the first-stage regenerative turbine impeller.

14. The regenerative turbine pump of claim 13, wherein the seal is a first seal, wherein the second-stage housing further comprises:

- a second seal that at least partially fluidically separates a first axial impeller side from a second axial impeller side on the second-stage regenerative turbine impeller, wherein the second fluid inlet is fluidically connected to the first axial side of the second-stage impeller, wherein the first fluid outlet is fluidically connected to the second axial side of the second-stage regenerative turbine impeller;
- a fourth fluid inlet fluidically connected to the second axial side of the second-stage regenerative turbine impeller; and
- a fourth fluid outlet fluidically connected to the second axial side of the first-stage regenerative turbine impeller.

15. The regenerative turbine pump of claim 14, wherein the first fluid inlet and first fluid outlet are on a first side of the regenerative turbine pump, the second fluid inlet and the second fluid outlet are on a second side of the regenerative turbine pump, the third fluid inlet and the third fluid outlet are one a third side of the regenerative turbine pump, and the fourth fluid inlet and the fourth fluid outlet are on a fourth side of the regenerative turbine pump, wherein the first side, the second side, the third side, and the fourth side are evenly spaced circumferentially along an outer surface of the regenerative turbine pump.

* * * * *

UNITED STATES PATENT AND TRADEMARK OFFICE
CERTIFICATE OF CORRECTION

| | |
|---|---|
| PATENT NO. | : 11,125,234 B2 |
| APPLICATION NO. | : 15/857443 |
| DATED | : September 21, 2021 |
| INVENTOR(S) | : Biddick et al. |

It is certified that error appears in the above-identified patent and that said Letters Patent is hereby corrected as shown below:

In the Claims

Column 12, Line 10, Claim 4, delete "first: stage" and insert -- first-stage --.

Signed and Sealed this
Sixteenth Day of August, 2022

Katherine Kelly Vidal
*Director of the United States Patent and Trademark Office*